United States Patent [19]

Drbal

[11] Patent Number: 4,940,249

[45] Date of Patent: Jul. 10, 1990

[54] CLAMP DEVICE WITH RADIALLY SPLIT HEAD

[76] Inventor: Vladimir J. Drbal, 400 Davey Glen Rd., Belmont, Calif. 94002

[21] Appl. No.: 310,356

[22] Filed: Feb. 13, 1989

Related U.S. Application Data

[63] Continuation-in-part of Ser. No. 116,021, Nov. 3, 1987, Pat. No. 4,804,197.

[51] Int. Cl.[5] .......... B23B 31/20

[52] U.S. Cl. .......... 279/41 R; 174/65 G; 248/27.3; 279/42; 285/322; 403/290

[58] Field of Search .......... 174/65 R, 65 G; 248/27.3; 279/41 R, 42, 46 R; 285/322, 243, 245, 257; 403/289, 290

[56] References Cited

U.S. PATENT DOCUMENTS

| | | | |
|---|---|---|---|
| 1,615,233 | 1/1927 | Redinger . | |
| 1,659,268 | 2/1928 | Hooley . | |
| 2,383,692 | 8/1945 | Smith . | |
| 2,452,184 | 10/1948 | Cole | 279/46 R |
| 3,123,662 | 3/1964 | Fink | 174/65 G |
| 4,302,035 | 11/1981 | Ochwat | 174/165 R X |
| 4,530,523 | 7/1985 | Proni | 285/179 |
| 4,544,186 | 10/1985 | Proni | 285/243 |
| 4,804,197 | 2/1989 | Drbal | 279/41 R |

FOREIGN PATENT DOCUMENTS

| | | |
|---|---|---|
| 2442392 | 6/1980 | France . |
| 87205 | 8/1936 | Sweden . |

*Primary Examiner*—Steven C. Bishop
*Attorney, Agent, or Firm*—Peter J. Dehlinger

[57] ABSTRACT

A device for clamping a pair of workpieces together. The device includes a pair of fastener heads, each defining a segmented head which is designed to clamp a workpiece a passageway in the head, as an interior camming surface in the head is moved axially against a contact surface. The two heads are mounted for axial movement toward and away from contact position at which the camming surfaces of the two heads are simultaneously brought into contact with an associated contact surface, with further movement of the two heads axially toward one another acting to force the segments in each head radially inwardly, substantially the same extent, to produce simultaneous clamping of workpieces held in each head.

3 Claims, 4 Drawing Sheets

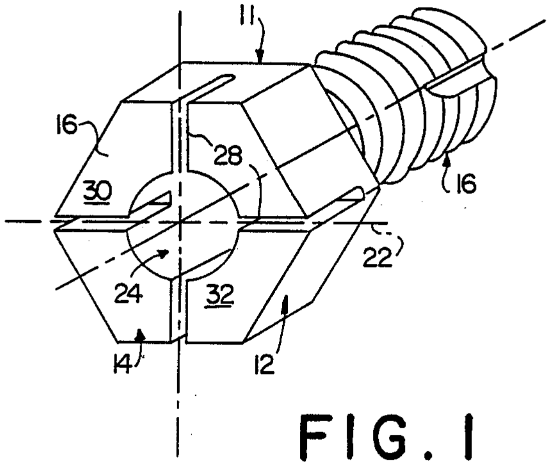
FIG. 1
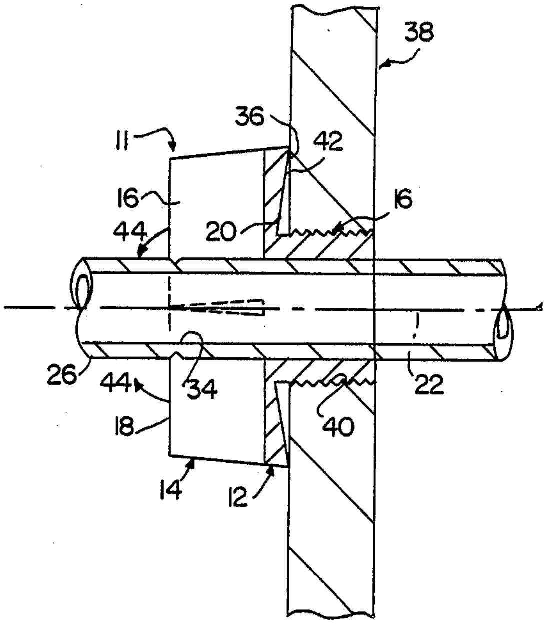
FIG. 2
FIG. 3
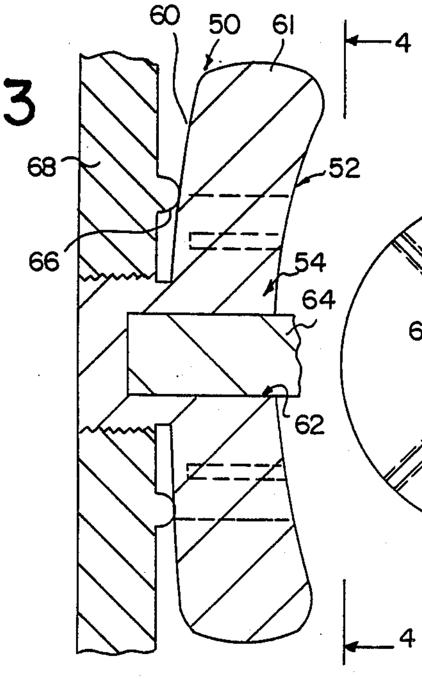
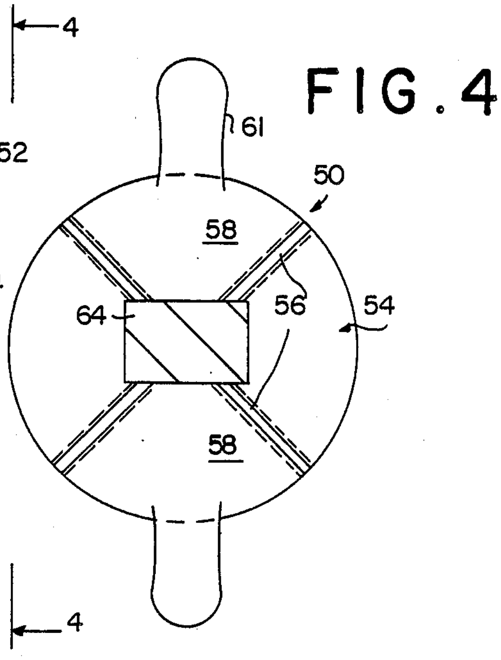
FIG. 4

CLAMP DEVICE WITH RADIALLY SPLIT HEAD

This application is a continuation-in part of copending patent application for "Clamp Device with Radially Split Head", Ser. No. 116,021, filed Nov. 3, 1987, now U.S. Pat. No. 4,804,197.

1. Field of the Invention

The present invention relates to split-head clamp devices for use in mounting, clamping or connecting workpieces.

2. Background of the Invention

Split head clamping fasteners have long been known, especially in the electrical connector art. Examples of such fasteners are found in U.S. Pat. Nos. 368,149; 1,809,381, 2,406,346; and 2,440,828 for holding an electrical wire which passes through that portion of the fastener which is a collet having a radially split head. The head has an increasing outer diameter, resembling a cone, which is to mate with a ferrule having a funnel shaped interior. The body of the collet is threaded and, after passing through the ferrule, is secured by a collet nut, which draws the conic head further into the ferrule and thereupon forces the segments of the split head radially inward against the work piece, an electrical cable. The ferrule itself is fastened to a main body, such as an electrical panel or battery.

Although this prior art type of fastener is useful, it is limited by the fact that it requires several mating parts as well as mechanical access to both ends of the ferrule; one end for inserting the collet and the other end for threading the collet nut. The fact that the fastener itself must be secured to a primary support further limits its versatility. Also, the mechanical force necessary to draw the collet into the ferrule requires a threaded pair of parts and a hand tool for tightening the collet nut.

Swedish Pat. No. 87,205 discloses a clamping device in which tightening a nut on a threaded, slotted shaft reduces the interior shaft diameter, causing a clamping action of a tubular workpiece held in the shaft. U.S. Pat. No. 1,615,233 shows a similar type of clamp, in which tightening a nut on a conical, segmented head draws the segments together to produce a clamping action. U.S. Pat. No. 2,383,692 and French Patent No. 2,442,392 show similar types of split shaft clamps in which tightening a nut on a conical, segmented shaft produces clamping action on a workpiece held in the shaft.

More recently, U.S. Pat. Nos. 4,530,523 and 4,544,196 teach a clamping device in which clamping is produced by a pivoting action of threaded shaft segments. Here a nut carried on the shaft forcibly abuts a clamp surface, as the nut is tightened, and the reaction force is transmitted through the action of the bevelled nut threads to the bevelled shaft threads, to cause a slight pivoting in the clamp segments, to produce clamping of a workpiece held in the shaft.

It will be appreciated that all of the later-mentioned prior art clamp devices have a slotted shaft designed to produce a clamping action as a nut is advanced along the threaded shaft. One limitation of this construction is that clamping action requires interaction with a threaded nut, and thus precludes for example, the possibility of a simple screw-like shaft which can be engaged with a wall surface or the like, for clamping a workpiece to a wall surface. Secondly, each clamp member must be fully duplicated in a two-sided clamp, i.e., a clamp designed to clamp two workpieces together. Such devices are also limited to threaded engagement between a shaft and nut, and thus require turning in order to achieve clamping action.

3. Summary of the Invention

It is one object of the present invention to provide an improved clamping device which overcomes problems and limitations associated with prior art clamps.

A more particular object of the invention is to provide a clamp device in which clamping action is produced by clamping action of a segmented clamp head, rather than by closure of slotted shaft segments.

One advantage provided by this construction is that the clamping action can be achieved by advancing a screw-like shaft into a wall surface or the like, for clamping a workpiece to the wall surface.

Another advantage provided by the construction is that a two-sided clamp may be formed in which clamping action is achieved by interaction of clamping members on each side of the clamping device.

Still another advantage of this construction is that clamping can be achieved with threaded engagement between a shaft and tightening nut.

Providing a clamping device in which the clamping force is directed against a relatively narrow annular region of the workpiece is yet another object of the invention.

The clamping device of the invention includes a split head fastener composed of a head having exterior and interior surfaces, and a shaft attached to the head and extending substantially normally from the interior surface thereof, along a longitudinally extending central axis. The head defines a passageway extending inwardly along this axis from the exterior surface, and dimensioned for receiving a portion of such workpiece. The head further defines slots extending from the exterior surface generally axially toward but not to said interior surface, these slots forming segments in the head which function as clamping members.

A threaded member carried on the shaft for axial movement thereon, has a contact face designed to contact the inner surface of the head in an outer surface region thereof which is radially spaced from the region of attachment of the shaft to the head. Advancing the member along the shaft forces the contact surface against this outer surface region, forcing the segments in the head to pivot inwardly. This reduces the cross section of the passageway adjacent the exterior surface of the head, causing clamping of a workpiece received in the passageway.

In one general embodiment, the interior surface of the head includes a camming surface which typically is formed by an undercut in the interior surface, or by one or more projections from a planar interior surface. The contact surface of the tightening member can be substantially planar.

In a second general embodiment, the contact face of the tightening member includes a camming surface which extends from the contact face. This surface may also be formed as an undercut in the contact face or by one or more projections from a planar contact face. The interior surface of the contact face may be substantially planar.

In an embodiment intended for attaching a workpiece to a support surface or the like, the shaft is a threaded screw which can be advanced into the support by turning, and the interior surface includes a camming surface which extends from its outer surface region axially in the direction of the shaft. When the split head fastener is advanced toward the support, Contact of the camming surface with the wall produces pivoting action on the head segments, causing clamping of a workpiece in the fastener.

In a two-sided clamp of the invention, for use in clamping a pair of workpieces axially in tandem, the tightening member of one side of the clamp functions as the tightening member of the other side of the clamp, i.e., the two heads interact to apply opposed axial forces against one another's interior surfaces, to cause the segments in each head to pivot toward a clamping condition.

These and other objects and features of the invention will become more fully apparent when the following detailed description of the invention is read in conjunction with the accompanying drawings.

BRIEF DESCRIPTION OF THE DRAWINGS

FIG. 1 is a perspective view of a split-head fastener constructed according to one embodiment of the invention;

FIG. 2 is a side sectional view of the fastener of FIG. 1, shown operatively attached to a tightening member for clamping a tubular workpiece;

FIG. 3 is a side sectional view of a clamping device formed according to another embodiment of the invention, and showing a rectangular workpiece supported therein;

FIG. 4 is a front-on view of the device of FIG. 3, as seen along a view line 4—4 in FIG. 3;

FIG. 10 is a side sectional view of a fastener designed for mounting a workpiece on a wall surface or the like;

DETAILED DESCRIPTION OF THE INVENTION

Figure 5:
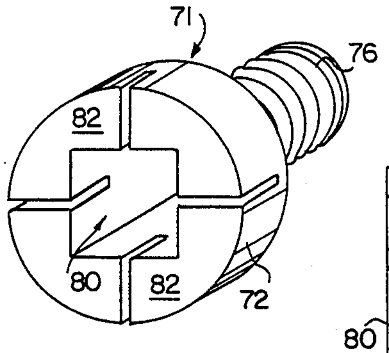
FIG. 5 is a perspective view of a split-head fastener designed for press-fit clamping.

FIGS. 1 and 2 show on preferred embodiment of a clamping device 11 constructed according to the invention. The device includes a composite split-head fastener 12 composed of a head 14 and a threaded, cylindrical shaft 16 formed to define a unitary body. The head has an exterior surface 18 and an interior surface 20 seen in FIG. 2. As seen best in FIG. 2, the shaft extends substantially normally from the interior surface of the head, along a longitudinal axis 22. A passageway 24 formed in the fastener extends along axis 22 from the exterior surface inwardly, as can be appreciated from FIG. 2, the passageway is dimensioned to receive a workpiece 26, such as a tubular workpiece therein. The workpiece may be of any of a variety of tubular members, such as glass tubing, rigid metal tubing cables, ropes or rod material, such as optical figures or the like which is to be clamped.

With reference particularly to FIG. 1, the head contains a plurality of radial slots, such as slots 28, which extend from the exterior surface of the head in a generally axial direction toward but not to the interior surface of the head. That is, the slots extend only partway through the head. As can be appreciated from the figures, the slots form two sets of opposed segments, such as opposed segments 30, 32, which define the portion of the passageway adjacent the head's exterior surface. Each segment is provided with a lip, such as lip 34 (FIG. 2) adjacent to the entrance of the passageway. These segment lips collectively form a substantially annular lip used in clamping the workpiece securely, as will be seen.

According to an important feature of the invention, the interior side of the head is undercut, as seen in FIG. 2, forming an outer surface region 36 which projects axially, in the direction of the shaft, beyond the interior surface region adjacent the region of attachment of the shaft to the head. In the present case, this surface region is the substantially circumferential region at the outer edge of the interior surface. This edge projection is also referred to herein as a camming surface.

Also included in the device is a tightening member 38 which may be a threaded nut or a threaded portion of a larger support structure, such as a jig on a machine. Member 38 is internally threaded at 40 for threaded engagement of threaded shaft 16. The surface of the tightening member which confronts the interior surface of the head is referred to herein as a contact face 42. More specifically, this face is designed to contact the camming surface of the head, as the member is advanced toward the head by relative rotation of the shaft and the tightening member.

Considering now an operation for clamping workpiece 26 in the clamping device, the fastener and tightening member are initially placed in a position at which the segments in the head are freely expanded. The workpiece is then inserted into the passageway and moved to a designed axial position for clamping. The fastener is now rotated relative to the tightening member to advance the contact surface against the camming surface on the head. In the case where the tightening member is a wall support or the like, the tightening is done by rotating the fastener, e.g., by engaging the hex head. Where the tightening member is a nut or the like, the tightening may be accomplished by torquing this nut. The latter operation has the advantage that the workpiece is not rotated during a clamping operation. In this configuration, the fastener may be formed integrally with or secured to a wall or other support, for mounting the workpiece on the support.

As can be appreciated from FIG. 2, further advancing of the fastening member causes the outer edge to pivot as if the region of contact between the camming surface and the tightening member were a fulcrum, thus bringing the interior surface of the head closer to and more parallel with the surface of the tightening member. Arrows 44 in FIG. 2 indicate the pivoting action, which causes the inner walls of the segments in the head to pivot inward and no longer lie parallel to each other. This pivoting is exaggerated in FIG. 2 for ease of viewing.

As each of the segments pivots inwardly, toward axis 22, the lateral space, i.e., the width of the slots forming the segments, is reduced, as is exaggerated in FIG. 2, and the cross-sectional area of the passageway, adjacent the exterior surface of the head, is reduced. Effectively, the segments act as jaws which clamp together as the tightening member is advanced toward the head. It is also noted that the region of greatest radial movement of the segments is the region adjacent the exterior surface of the head, i.e., the region containing the segment lips, such as lip 34. The clamping action thus forces the segment lips tightly against the workpiece. The workpiece is now securely clamped to the support which serves as the tightening member.

The device is held in the clamped position, of course, by the engagement of the shaft threads with those of the tightening member. This threaded engagement is also referred to herein as means for holding the fastener in a clamping condition.

It can be appreciated that the camming surface on the fastener may be located at a selected radial position with respect to axis 22 to provide a desired balance between the tightening force required to produce clamping. As the effective moment arm of the camming surface (its radial distance from axis 22) is increased, less force is required in tightening, but proportionately less pivoting occurs with the same axial movement of the camming surface toward the contact surface. Thus, placing the camming surface outside the radius of the head would provide a longer fulcrum arm and thus yield the desired pivoting of the clamping segments with less opposition to the advancing movement of the shaft. Conversely, if the camming surface is positioned close to the axis of the fastener, more pivoting would be achieved, but at the expense of increased work to set the fastener into the supporting wall. Also, if the camming surface is too close to the region of attachment of the shaft to the head, the clamping action would be accomplished with too little forward motion of the fastener; hence, even a slight amount of inadvertent relaxing of the pressure between the camming surface and the abutting wall face could release the clamping of the workpiece.

The FIG. 1 embodiment can have a metal construction for heavy clamping or mounting uses, or can be formed of injected plastic components for lighter clamping requirements. As suggested above, either the fastener or tightening member may be formed integrally with a support element, such as a wall support or jig, for mounting a workpiece thereon. The device is suitable for clamping rods or tubes, such as glass rods, unthreaded conduit, or the like, rigidly with respect to a support surface, such as a wall surface, or where the fastener is used as a chuck for supporting a moving workpiece during machining.

FIGS. 3 and 4 show a clamping device 50 constructed according to another embodiment of the invention. As seen in the figures, the split head fastener in the device, indicated at 52, has a head 54 of generally circular periphery, with radial slots, such as slots 56, segments such as segments 58 and interior surface 60. A pair of wings, such as wing 61 formed integrally with the head can be used for manually turning the fastener, for clamping, as will be seen. A passageway 62 in the fastener is dimensioned for receipt of a workpiece, such as workpiece 64, having a rectangular cross section, as shown. The passageway terminates as a blind passage within the shaft, rather than being a through passageway as in the first described embodiment. The blind end of the passageway defines an interior seating position for the workpiece.

As in the first-described embodiment, the tightening member, indicated at 68, may be formed as part of a support element, such as a wall or jig, or may be a nut, where the fastener is secured to a support element, as above. The tightening member is secured to a support element, as above. The tightening member has an annular ring 66 which projects axially beyond the surface plane of the tightening member. This ring provides a camming surface for contacting the planar interior surface of the head, as illustrated, in an outer surface region which is radially spaced from the region of attachment of the shaft to the head. The camming surface generates the same pivoting action and clamping coaction with respect to the radial slots, segments, and passageway 62 as did the camming surface in the embodiment shown in FIGS. 1 and 2.

As above, the threaded engagement between the fastener shaft and threaded opening in the fastening member provides means for holding the fastener in a clamped condition.

The operation of the device is like that described above: after initial placement of the workpiece in the passageway, the fastener and fastening member are rotated relatively, to bring the camming surface on the member into contact with the interior surface of the fastening member, as seen in FIG. 3. Further tightening of the member then produces a greater clamping force on the workpiece, as the segments are forced progressively inwardly.

The workpiece could be a mounting projection of a relatively large device, such as a semi portable music tape playing device, which is to be removably mounted into an automobile. The ease of removal of the workpiece is for its safety and is easily accomplished by its owner with less than one full reverse turn of the fastener. Hence, the fastener need not be removed from the support (tightening member) to accomplish the loosening of the jaw like segments sufficient for removal of the workpiece. For securing a device such as a tape player, more than one of the subject fasteners can be employed in spaced apart relation.

Figure 6:
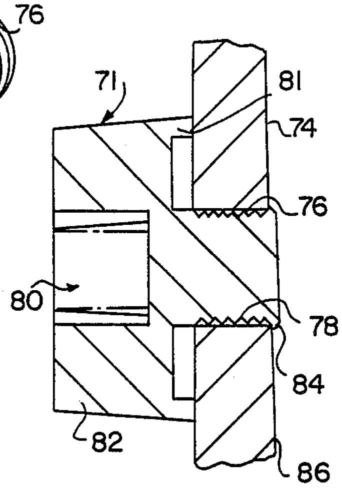
FIG. 6 is a side sectional view of the fastener of FIG. 5, shown operatively attached to a tightening member for clamping a workpiece.

Looking at FIGS. 5 and 6, there is illustrated a press fit clamp device composite embodiment 71, having a cylindrical head with a knurled periphery 72 providing a friction surface for manual grasping and pushing into an opening in a tightening member, such as the portion of a support structure 74 shown in FIG. 6. The shaft has parallel side walls as in the other embodiments and is formed with a serrated surface 76 for gripping into the sides of a smooth walled opening 78 formed in the structure, as the fastener is pushed into this opening. The passageway, indicated at 80, can be of square cross-section, as illustrated. Although the shaft in the fastener is shown to have a cylindrical shape, the cross-section of the shaft could be square or otherwise shaped to mate with a similarly shaped opening in the support, since insertion of the fastener into the support opening can be accomplished by forward pushing without any axial rotation.

As seen from the side view in FIG. 6, the camming surface is defined by a plurality of stud-like projections such as projections 81, spaced around the periphery of the interior surface of the head. Just as with the above-described embodiments, as the fastener 71 is advanced into engagement with the confronting contact surface of the support, the camming projections 81 generate a pivoting radially inward of segments 82 formed in the head of the fastener, to reduce the cross-sectional areas of the passageway, and provide clamping action. To prevent inadvertent loosening of the fastener, the leading end of the shaft has a flange 84 which is to seat against the rear surface 86 of the support. Obviously, the flange must be flexible enough to bend toward and away from the shaft serrations during insertion and subsequent intended removal of the fastener, yet be resilient enough to withstand some reasonable amount of withdrawal direction forces caused by other than intentional removal of the fastener. Molded plastic would be satisfactory material for the split head fastener.

Figure 7:
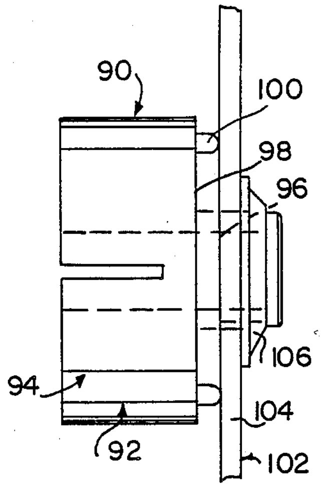
FIG. 7 is a side sectional view of a clamping device formed according to another embodiment of the invention.

In the clamping device illustrated in side view in FIG. 7, and indicated at 90, a fastener 92 has the general construction of fastener 12 described above, including a segmented head 94 and a cylindrical threaded shaft 96 extending from the interior surface 98 of the head. The interior surface has an axially extending annular camming surface 100 for engaging the surface of a tightening member.

The tightening member, shown generally at 102, has a two-piece construction, including a relatively thin plate 104 and a nut 106 which is threadedly engaged with shaft 96 and which supports the plate from behind, i.e., as it is moved against the camming surface on the fastener. It is to be noted that the figure illustrates the fastener in the non-clamping orientation, i.e., with the faces of the slot and the sides of the head parallel to the longitudinal axis of the fastener, in contrast to the corresponding non-parallel orientation shown in FIGS. 1 and 2.

In operation, the fastener is placed through the opening in the plate and nut 106 is tightened on the shaft until the fastener is supported on the plate. The workpiece is now inserted into the passageway in the fastener, as above, and the nut 106 is then tightened to force the plate against the camming surface, to produce a clamping against in the fastener.

Figure 8:
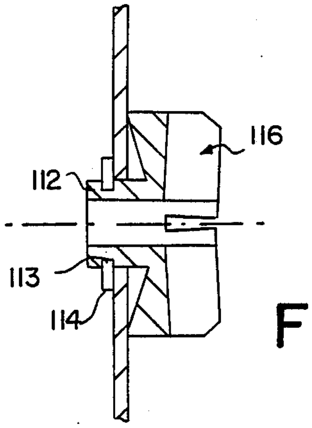
FIG. 8 is a side sectional view of another type of clamping device formed in accordance with the invention.

FIG. 8 illustrates another embodiment of a clamping device 110 useful for supporting or attaching a workpiece on a thin plate, which again forms a part of the tightening member in the device. Here the shaft in the fastening member, indicated at 112, has an annular groove 113 adapted for receiving a retaining ring 114 when the device is in a clamped condition. The plate and the ring thus form a two piece tightening member for forcing the segments in the fastener into a clamped position when the camming surface of the fastener, indicated at 116, is pressed against the confronting contact face of the plate, as illustrated.

In operation, a workpiece is placed in the fastener, at a selected position, and the workpiece and fastener are inserted into the shaft opening formed in the plate. The fastener is then forced into a clamping condition, either by pushing the fastener from the front (exterior) side, or pulling on the rear (interior) side until the retaining ring can be slipped into groove 113, to lock the device in a clamped condition. The engagement of the retaining ring with the shaft groove thus provides the means for holding the fastener in a clamped condition.

In a related embodiment (not shown), the retaining ring is replaced by a spring-loaded ring which is forced into a position of locking engagement with the shaft groove when the fastener head is forced against the plate. This latter embodiment, like the embodiment illustrated in FIG. 6, is a self-locking clamp, i.e., clamping occurs by forcing the fastener axially into a locking position, without having to rotate the fastener or manipulate the device from the rear of the support.

Figure 9:
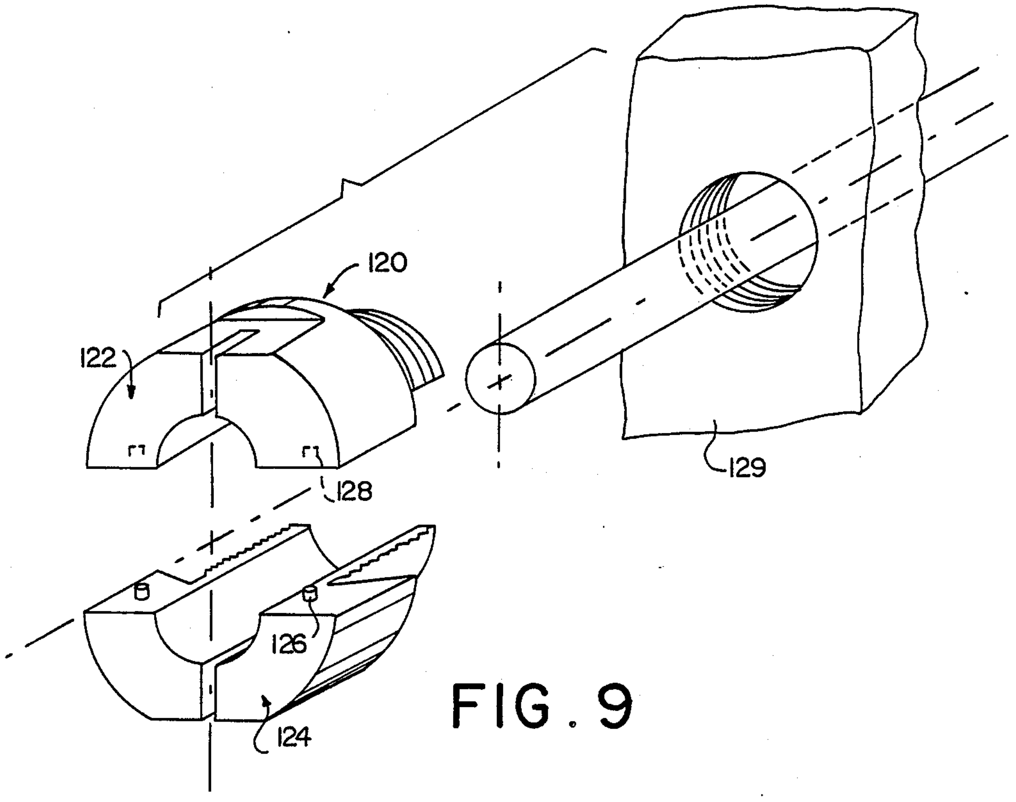
FIG. 9 is an exploded perspective view of a clamping device in which the fastener is composed of a pair of axially symmetric halves.

The fastener 120 in FIG. 9 has the characteristics of the unitary fasteners described above, such as fastener 12, but is split axially into two axially symmetrical halves 122 and 124 for ease of installation under certain conditions. Any suitable keying or detent means, such as pin 126 and socket 128, can be employed for maintaining alignment of the portions as they are being threaded into the tightening member, a portion of which is shown at 129. Since the alignment and initial threading can be accomplished by hand, but the final tightening might require a tool, the periphery of the head is provided with both flat and knurled surfaces.

Figure 10:
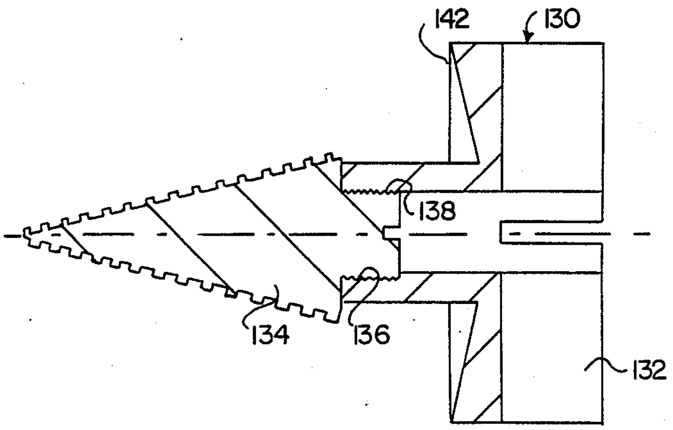

Shown in FIG. 10 is yet another fastener 130 in which the head 132 and shaft 134 are separable, as by threads 136 and 138. By being separable, any of the prior embodied head configurations could be mated with any of the shafts. With only a relatively few head parts and shaft parts for inventory, there can result numerous different fasteners for a variety of different purposes. A special advantage of a separable shaft is that it can be made of a different material than the head.

For example, the shaft 134 is shown as a wood screw and would be of metal, but the head 132 could be of plastic and thereby easier to mount manually. Moreover, the separate shaft can be wall-mounted with use of greater force and torque, if need be, without fear of damaging radially split segment such as segment 140. In the operation of the device shown in FIG. 10, the fastener is preferably screwed into, but not tightened against, a support surface, which provides the tightening member contact surface in the device. After placing the workpiece in the fastener, the workpiece and fastener are turned to tighten the camming surface of the fastener, indicated at 142, against the support contact surface, until the pivoting of the segments in the fastener against the workpiece produces the desired clamping action.

Figure 11:
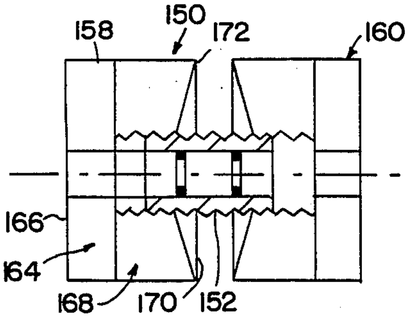
FIG. 11 shows a two-sided clamp constructed according to an embodiment of the invention in which the head of one side of the clamp functions as a fastening member at the other side of the clamp.

FIG. 11 shows a two-sided clamping device 150 constructed according to the invention, for use in clamping a pair of workpieces, such as two tubes, together—typically in abutting, end-to-end relationship. The device includes a hollow threaded shaft 152 which is dimensioned to receive the two workpieces therein, and may be provided with O-rings, such as O-ring 154, for sealing the two workpieces within the shaft.

Each end of the shaft threadedly engages a fastener head, such as head 158 at the left side of the shaft, and head 160 at the right side. Head 158, which is representative, has a segmented exterior portion 164 terminating at an exterior surface 166, and a threaded interior portion 168 terminating at an undercut interior surface 170, defining a camming surface 172 at the outer edge of the interior surface. The head is designed, as above, such that force applied to the camming surface causes pivoting of the segments in the exterior portion of the head, to lock a workpiece in the passageway formed axially in the head.

In operation, the two workpieces to be joined are placed into the shaft, end to end, and the two heads are then advanced toward one another, for contact preferably near the middle of the shaft. As can be appreciated from the figure, the two camming surfaces on the confronting heads are designed to act against one another as the heads are tightened against the other. As this occurs, the segments in both heads are caused to pivot toward the center axis of the shaft, to clamp each associated workpiece to the shaft. Thus, each head serves both as a fastener, in combination with shaft 152, for securing a workpiece to the shaft, and as a tightening member, for providing a contact surface against which the camming surface in the opposite head is forced.

The two-sided clamp shown at FIG. 11 may be modified for quick-lock action in which each head rides on a wide thread or groove for locking action over a short had rotation, such as a quarter turn rotation. The means for holding the heads against one another may here include a ball and socket configuration formed in the confronting interior surfaces of the heads, such that head rotation to a locking position brings a ball (rounded protuberance) from one head into a socket in the other head. The heads would here preferably be formed of a flexible polymer material, such as polyethylene or teflon.

Figure 12:
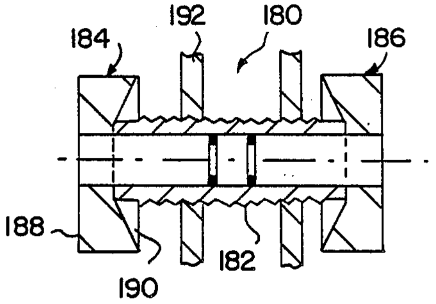
FIG. 12 shows a two sided clamp constructed according to another embodiment of the invention.

FIG. 12 shows another embodiment of a two-sided fastener device 180 for use in connecting a pair of workpieces, such as tubes, end-to-end. The device includes a threaded, hollow shaft 182 which is joined at its opposite ends to heads 184, 186, which each have the general construction described with respect to FIG. 1. Each head, such as head 184, thus forms with the shaft, a fastener having an outwardly facing exterior surface, such as surface 188, and an inwardly facing interior surface, such as surface 190, which provides an outer camming surface.

The device further includes a pair of nuts, such as nut 192, which each serve as a tightening member in the corresponding side of the device. The operation of the device follows the general principles described above, where a pair of workpieces are first inserted into the shaft, then each nut is tightened against the corresponding camming surface, to clamp the associated workpiece to the shaft.

Figure 13:
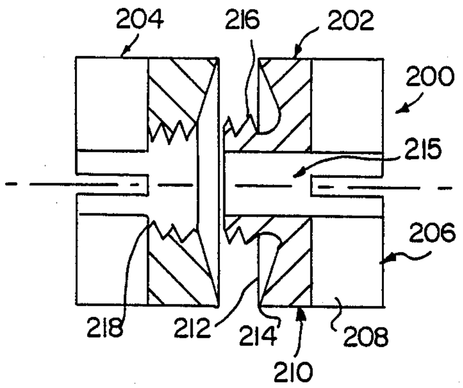
FIG. 13 is a side sectional view of another embodiment of a clamp device designed for clamping a pair of workpieces by relative rotation of a pair of clamping heads towards one another.

FIG. 13 shows another embodiment of a two-sided clamping device 200 designed for clamping a pair of workpieces, such as two tubes, together—typically in abutting, end-to-end relationship. The device differs from device 150 above in that the hollow shaft in which the workpieces are receives is integrally formed with one of the clamping heads More generally, and like device 150, device 200 includes a pair of clamping or fastener heads 202, 204, and means mounting the two heads for axial movement toward and away from a contact position at which the two heads exert a mutually clamping action on one another. Head 202, which is representative, has a segmented exterior portion 206 defining slots, such as slot 208, and an interior portion 210 terminating at an undercut interior surface 212, defining a camming surface 214 at the outer edge of the interior surface. The head is designed, as above, such that force applied to the camming surface causes pivoting of the segments in the exterior portion of the head, to lock a workpiece in the passageway, indicated at 215 formed axially in the head. The clamping portions of head 204 are similarly constructed.

The mounting means in the device includes a hollow threaded shaft 216 formed integrally with head 202, and a threaded socket 218 formed in the axially extending passageway in head 204, as seen. Shaft 216 is threadably engageable with socket 218, to produce axial movement of the two heads toward and away from a contact position, with relative rotation of the two heads. The contact position is, of course, the point at which the two mutually confronting camming heads first make contact with each other.

As in the operation of above described device 150, the two camming surfaces on the confronting heads are designed to act against one another as the heads are tightened against the other. As this occurs, the segments in both heads are caused to pivot toward the center axis of the shaft, to clamp each associated workpiece to the shaft. Thus, each head provides both a camming surface and a contact surface (provided by the camming surface of the other head) against which the camming surface is tightened, to produce clamping action. Since the force on the two heads is mutual and in opposite directions, both heads are forced toward a clamping condition to substantially the same degree. That is, the clamping force applied by each head is substantially the same as the two heads are tighened against one another. Of course, the two heads may be designed, for example by providing different moment arms on the segments in each head, to produce different clamping force in the two heads.

Figure 14:
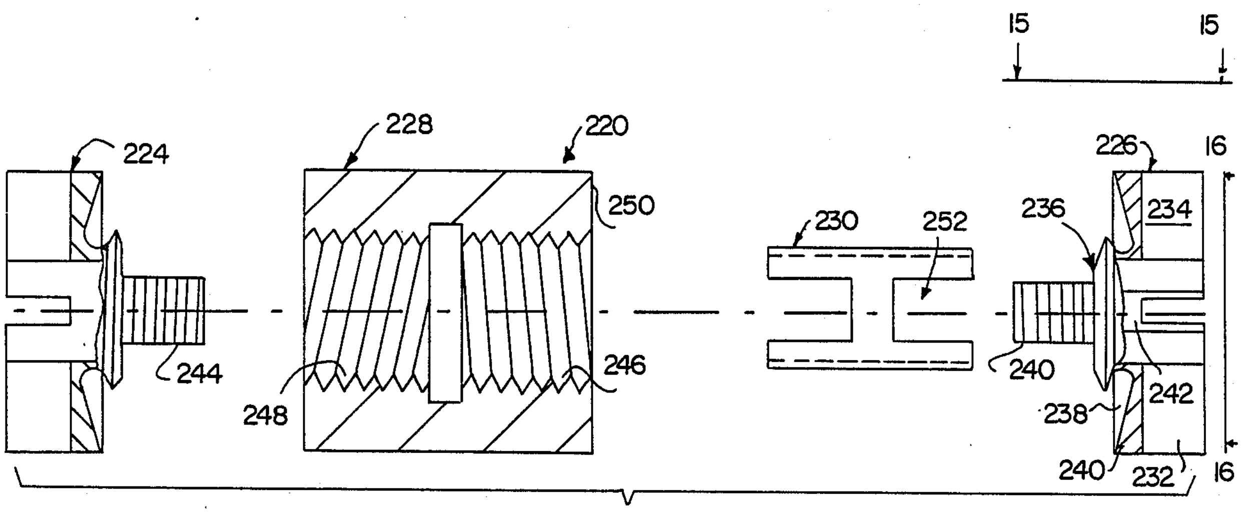
FIG. 14 is a side exploded view of an embodiment of a clamping device designed for clamping a pair of workpieces by rotation of a turnbuckle in the device.
Figure 15:
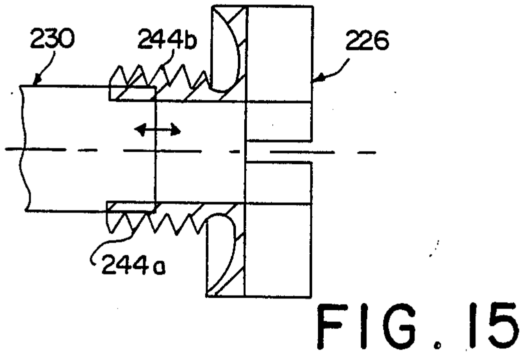
FIG. 15 shows a head in the FIG. 14 device, as viewed along along line 15—15 in FIG. 14.
Figure 16:
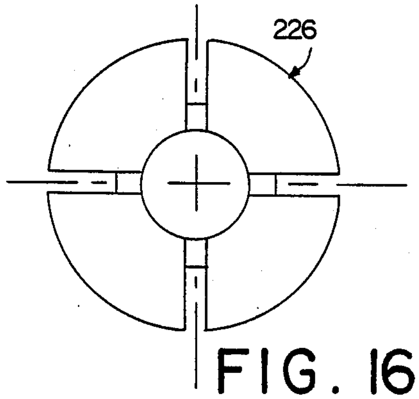
FIG. 16 is an end view of a head in the FIG. 14 device, as seen along line 16—16 in FIG. 14.

FIGS. 14–16 illustrate still another embodiment of a clamping device 220 constructed for clamping a pair of workpieces by simultaneous clamping in opposed, segmented clamping heads. Device 220 generally includes a pair of clamping heads 224, 226, and mounting means which includes a turnbuckle 228 which threadably engages the two heads, and an alignment sleeve 230 which acts to hold the two heads in alignment when the turnbuckle is rotated.

Head 226, which is representative, has a segmented exterior portion 232 defining slots, such as slot 234, and an interior portion 236 having an undercut interior surface 238, defining a camming surface 240 at the outer edge of the interior surface. The head is designed, as above, such that force applied to the camming surface causes pivoting of the segments in the exterior portion of the head, to lock a workpiece in the passageway, indicated at 242 formed axially in the head.

Head 226 contains an axially extending threaded region or shaft 240 whose threads are opposite in direction to the threaded region 244 of head 224. As seen in FIGS. 14 and 15, the interior portions of the threaded region is formed by two axial projections *244a*, *244b*.

Turnbuckle 228 is a cylindrical sleeve having right-side and left side threaded sockets 246, 248, respectively, which are threadably engageable with threaded regions 240, 244, respectively. The two threads in the turnbuckle sockets have opposite directions, so that when the turnbuckle is rotated in one direction relative to the heads, with the heads engaged with the sockets, the heads are drawn together, and when rotated in the opposite direction, the heads are moved apart.

The opposite end surfaces of the turnbuckle, such as end surface 250, provides the contact surfaces which contact the associated camming surface of the heads, as the heads are drawn toward a contact position at which the camming surfaces first contact the turnbuckle end surfaces.

Completing the description of device 220, alignment sleeve 230 is dimensioned to be received slidably and rotatably within the interior of turnbuckle 228. A pair of axially extending slots, such as slot 252, (FIG. 14) are dimensioned to receive the threaded projections of associated camping heads snugly therein for axial sliding movement (in the direction of the arrow in FIG. 15). In the fully assembled device, the threaded projections from each clamping head are slidably received in the associated slots, so that the two heads are forced to rotate as a unit, i.e., are held in alignment, as the turnbuckle is rotated relative to the heads.

In operation, with the device in its fully assembled condition, a workpiece is inserted into the passageway defined in the associated head. The turnbuckle is then rotated relative to the two heads in a direction which moves the two heads simultaneously toward the opposite end surfaces of the turnbuckle. With continued movement, and assuming the heads are initially assembled at equal distances from the ends of the turnbuckle, the two camming surfaces are brought into simultaneous contact with the confronting contact surfaces. Additional turning of the turnbuckle causes the segments in each head to be directed radially inwardly, to substantially the same extent, to produce simultaneous clamping at each end of the device.

From the foregoing, it can be appreciated how various objects and features of the invention have been met. The device can be constructed for applying large clamping forces on a workpiece, produced by pivoting of the jaws of a segmented head against the workpiece. Unlike conventional slotted shafts which are squeezed into a clamping condition, and which tend to undergo irreversible deformation on clamping, the segmented heads in the present invention tend to return to an open-jaw condition after clamp release, allowing repeated clamping and unclamping operations.

The device can be constructed in a variety of configurations suitable for different workpiece mounting. For example, the workpiece can be supported in only the head portion of the device, or can extend completely through the shaft as well. The tightening mechanism can be designed so that the workpiece rotates during tightening (by rotating the fastener), or so that the workpiece is held stationary during tightening (by rotating the tightening member). Alternatively, in the embodiments shown in FIGS. 6 and 8, clamping is effected without any rotation, simply by advancing the fastener axially against the tightening member. In another embodiment, a workpiece can be mounted on a support by screwing the fastener into the support.

The novel clamping mechanism of the invention also allows construction of a two-sided clamp having a simplified construction in which the fastener on one side of the clamp serves as the tightening member on the other side.

While the invention has been described with reference to specific embodiments, it will be realized that various modifications and changes can be made within the scope of the invention.

It is claimed:

1. A device for clamping a pair of workpieces together comprising:

a pair of fastener heads, each defining an axially extending passageway, and each composed of an exterior portion having an exterior surface and defining slots extending axially from said surface, said slots forming segments in said head about said passageway, and an interior portion defining an interior surface having a camming surface such that movement of the head in an axial direction against a contact surface forces the segments in the head radially inwardly, thereby reducing the cross-section of the passageway, adjacent the exterior surface of the head, and means mounting the two heads for axial movement toward and a way from a contact position at which the camming surface of the two heads are simultaneously brought into contact with an associated contact surface, with further movement of the two heads axially toward one another acting to force the segments in each head radially inwardly, substantially the same extent, thereby reducing the cross-section of the passageway associated with each head, and causing clamping of a workpiece received in the passageway defined by each head, said mounting means including a shaft on which the two heads are carried, for relative movement toward or from one another, with relative rotation of the heads on the shaft, to a contact position in which the camming surface of one head is in contact with the camming surface of the other head, such that the camming surface of each head serves as the associated contact surface for the other head, where said shaft is rigidly attached to one head, and the other head is rotatably mounted on the shaft for axial movement thereon, with rotation of said other head.

2. A device for clamping a pair of workpieces together, comprising:

a pair of fastener heads, each defining an axially extending passageway, and each composed of an exterior portion having an exterior surface and defining slots extending axially from said surface, said slots forming segments in said head about said passageway, and an interior portion defining an interior surface having a camming surface such that movement of the head in an axial direction against a contact surface forces the segments in the head radially inwardly, thereby reducing the cross-section of the passageway, adjacent the exterior surface of the head, and each of said heads further including an axially extending threaded region, in means mounting the two heads for axial movement toward and away from a contact position at which the camming surface of the two heads are simultaneously brought into contact with an associated contact surface, with further movement of the two heads axially toward one another acting to force the segments in each head radially inwardly, substantially the same extent, thereby reducing the cross-section of the passageway associated with each head, and causing clamping of a workpiece received in the passageway defined by each head, and said mounting means further including (a) a turnbuckle which engages the two threaded regions in opposite directions, such that rotation of the turnbuckle relative to the two heads moves the two heads simultaneously toward or away from one another, and (b) a pair of opposite contact surfaces designed to engage the associated camming surfaces of the two heads simultaneously, as the turnbuckle is rotated in one direction, to produce a simultaneous clamping action in each head.

3. The device of claim 2, wherein the mounting means further includes an inner sleeve which engages each of the head threaded regions for rotation therewith, and for axial movement with respect thereto, such that the two heads are maintained relatively non-rotating as the turnbuckle is rotated to move the two heads simultaneously toward and away from one another.

* * * * *